US011926219B2

United States Patent
Lechthaler et al.

(10) Patent No.: US 11,926,219 B2
(45) Date of Patent: Mar. 12, 2024

(54) HYBRID DRIVE SYSTEM

(71) Applicant: DAIMLER AG, Stuttgart (DE)

(72) Inventors: Thomas Lechthaler, Stuttgart (DE); Jan Velthaus, Stuttgart (DE); Lukas Rube, Plüderhausen (DE); Bernhard Ziegler, Rechberghausen (DE); Bernd Koppitz, Winterbach (DE); Kai Heukelbach, Köngen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 389 days.

(21) Appl. No.: 17/440,253

(22) PCT Filed: Mar. 6, 2020

(86) PCT No.: PCT/EP2020/055988
§ 371 (c)(1),
(2) Date: Sep. 17, 2021

(87) PCT Pub. No.: WO2020/187605
PCT Pub. Date: Sep. 24, 2020

(65) Prior Publication Data
US 2022/0176799 A1 Jun. 9, 2022

(30) Foreign Application Priority Data
Mar. 20, 2019 (DE) .................... 10 2019 001 959.8

(51) Int. Cl.
*B60K 6/40* (2007.10)
*B60K 6/387* (2007.10)
(Continued)

(52) U.S. Cl.
CPC ............... *B60K 6/40* (2013.01); *B60K 6/387* (2013.01); *B60K 6/405* (2013.01); *B60K 6/48* (2013.01);
(Continued)

(58) Field of Classification Search
CPC .......... B60K 6/40; B60K 6/387; B60K 6/405; B60K 6/48; B60K 2006/4825; B60Y 2410/102
See application file for complete search history.

(56) References Cited

U.S. PATENT DOCUMENTS 8,556,010 B2 * 10/2013 Ebert ...................... B60K 6/40
180/65.25
10,944,310 B2 * 3/2021 Ideue ..................... H02K 9/197
(Continued)

FOREIGN PATENT DOCUMENTS

| CN | 104773060 A | * | 7/2015 | ............... B60K 6/26 |
| CN | 111566374 A | * | 8/2020 | ............. B60K 6/387 |

(Continued)

OTHER PUBLICATIONS

International Search Report dated Jul. 15, 2020 in related/corresponding International Application No. PCT/EP2020/055988.
(Continued)

*Primary Examiner* — Jacob B Meyer
(74) *Attorney, Agent, or Firm* — PATENT PORTFOLIO BUILDERS PLLC

(57) ABSTRACT

A hybrid drive system for a motor vehicle includes a housing and an input shaft, which is provided to introduce torsional moments, which can be provided by an internal combustion engine, into the hybrid drive system, and which is rotatably mounted around a rotational axis. The system also includes an output shaft arranged coaxially in relation to the input shaft, an electric motor having a stator and a rotor, and a rotor support, which is non-rotationally connected to the rotor. The rotor support has a support hub, a support wall, and a support cylinder. The system also includes a separating clutch having a first inner disc carrier and a first outer disc carrier. A first bearing is arranged between the support hub and the housing. A second bearing is arranged between the
(Continued)

support hub and the input shaft. The support wall and the support cylinder are a one-piece sheet metal part.

6 Claims, 1 Drawing Sheet

(51) Int. Cl.
    *B60K 6/405*    (2007.10)
    *B60K 6/48*    (2007.10)

(52) U.S. Cl.
    CPC ... *B60K 2006/4825* (2013.01); *B60Y 2200/92* (2013.01); *B60Y 2410/102* (2013.01)

(56) References Cited

U.S. PATENT DOCUMENTS

| | | | | |
|---|---|---|---|---|
| 11,807,099 | B2 * | 11/2023 | Großpietsch | H02K 5/203 |
| 2008/0099258 | A1 * | 5/2008 | Berhan | B60K 6/405 |
| | | | | 180/65.22 |
| 2012/0080248 | A1 * | 4/2012 | Kasuya | H02K 9/19 |
| | | | | 903/902 |
| 2014/0128219 | A1 * | 5/2014 | Frait | B60K 6/48 |
| | | | | 903/902 |
| 2022/0144070 | A1 * | 5/2022 | Lechthaler | B60K 6/48 |
| 2022/0176799 | A1 * | 6/2022 | Lechthaler | B60K 6/40 |

FOREIGN PATENT DOCUMENTS

| | | | | | |
|---|---|---|---|---|---|
| CN | 111954605 | A | * | 11/2020 | ............ B60K 6/26 |
| CN | 113613927 | A | * | 11/2021 | ............ B60K 6/387 |
| DE | 102005053887 | A1 | | 5/2007 | |
| DE | 102015100046 | A1 | | 7/2015 | |
| DE | 102015226678 | A1 | * | 6/2017 | |
| DE | 102016211940 | A1 | * | 1/2018 | |
| DE | 102018000565 | A1 | * | 7/2019 | ............ B60K 6/387 |
| DE | 102018205471 | A1 | * | 10/2019 | ............ B60K 6/26 |
| DE | 102019001937 | A1 | * | 11/2019 | ............ B60K 6/387 |
| DE | 102019001957 | A1 | * | 9/2020 | ............ B60K 6/387 |
| DE | 102019001959 | A1 | * | 9/2020 | ............ B60K 6/387 |
| DE | 102020131760 | A1 | * | 6/2022 | |
| WO | WO-2018001621 | A1 | * | 1/2018 | |
| WO | WO-2020187467 | A1 | * | 9/2020 | ............ B60K 6/387 |
| WO | WO-2020187605 | A1 | * | 9/2020 | ............ B60K 6/387 |

OTHER PUBLICATIONS

Office Action dated Nov. 29, 2019 in related/corresponding DE Application No. 10 2019 001 959.8.
Written Opinion dated Jul. 15, 2020 in related/corresponding International Application No. PCT/EP2020/055988.

* cited by examiner

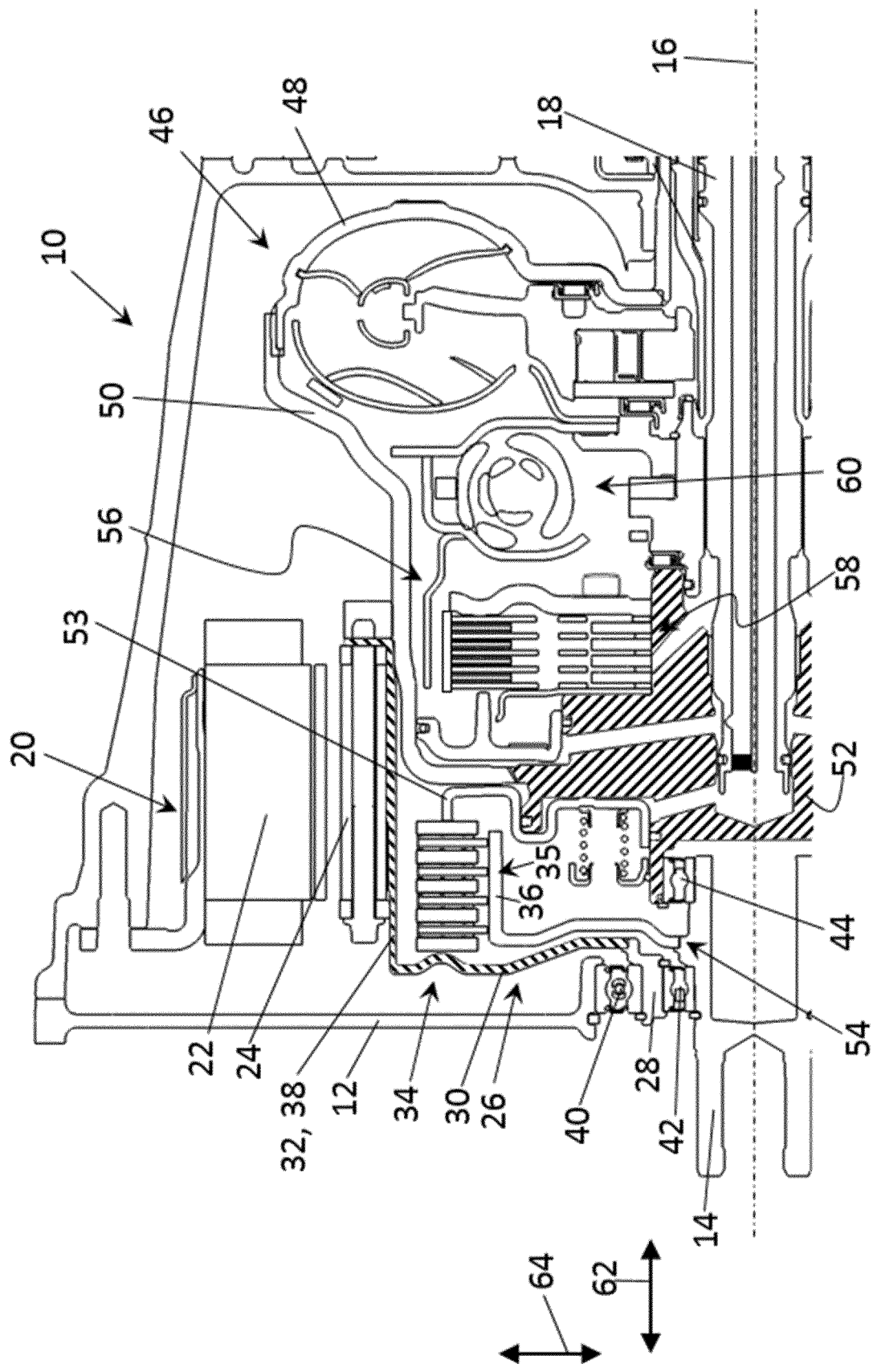

HYBRID DRIVE SYSTEM

BACKGROUND AND SUMMARY OF THE INVENTION

Exemplary embodiments of the invention relate to a hybrid drive system for a motor vehicle.

A hybrid drive system having an electric motor and a dry separating clutch is already known from generic DE 10 2005 053 887 A1, wherein a rotor support of the electric motor is mounted radially directly against a housing.

Generic US 2012/0 080 248 A1 shows a hybrid drive system, which moreover has a bearing of such a rotor support in relation to an input shaft of the hybrid drive system. Furthermore, an inner disc carrier of the separating clutch is non-rotationally connected to the input shaft, and an outer disc carrier of the separating clutch is non-rotationally fixed to the rotor support.

Exemplary embodiments of the present invention are directed to improving a hybrid drive system of the kind specified above in such a way that the lifespan and reliability are increased.

A hybrid drive system for a motor vehicle is taken as the starting point which has a housing and an input shaft, which is provided to introduce torsional moments, which can be provided by an internal combustion engine, into the hybrid drive system, and which is mounted around a rotational axis. Furthermore, the hybrid drive system has an output shaft arranged coaxially in relation to the input shaft, an electric motor, which has a stator and a rotor, and a rotor support, wherein the rotor support is non-rotationally connected to the rotor and comprises a support hub, a support wall and a support cylinder. Finally, the hybrid drive system has a separating clutch, which, for its part, has a first inner disc carrier and a first outer disc carrier.

Here, a first bearing is arranged between the support hub and the housing.

Furthermore, a second bearing is provided, which is arranged between the support hub and the input shaft, wherein the support wall and the support cylinder are designed as a one-piece sheet metal part.

The separating clutch can here be designed either as a dry separating clutch, for example as a dry multi-plate clutch, or also as a wet separating clutch, for example as a wet multi-plate clutch.

Furthermore, it is taken as a starting point that the first inner disc carrier is non-rotationally connected to the input shaft, and the first outer disc carrier is non-rotationally connected to the rotor support.

According to the invention, a third bearing is provided, and a torsional moment converter is provided, which has a pump wheel, a converter cover non-rotationally connected to the pump wheel, and a converter hub non-rotationally connected to the converter cover, wherein the third bearing is arranged between the input shaft and the converter hub and is formed to mount the converter hub rotatably in relation to the input shaft.

The first bearing and the second bearing are here designed at least as radial bearings. Advantageously, the first bearing and the second bearing are designed as stationary bearings, which bear both radially and axially. Particularly advantageously, the first bearing and the second bearing are designed as deep groove ball bearings. Particularly advantageously, the first bearing and the second bearing are designed as lifetime-lubricated sealed bearings.

It has been highlighted that a transfer of dirt, namely when using the dry separating clutch mentioned above, or a transfer of fluid, namely when using the wet separating clutch mentioned above, from the separating clutch towards the rotor, the stator, a power electronic system, and a contacting of the electric motor can be clearly reduced by the combination of an entire component designed as one piece made of the support wall and support cylinder with the specific arrangement of the first bearing and the second bearing. Independent of the kind of separating clutch used, the concept according to the invention thus always offers the following advantages: on one hand, an extensively dirt-free space around the rotor is guaranteed, on the other hand, a dry space around the rotor is guaranteed, whereby liquid conveying losses and splash losses can be avoided.

A non-rotational connection between two rotatably mounted elements is to be understood to mean that the two elements are arranged coaxially in relation to each other and are connected to each other in such a way that they rotate with the same angular speed.

Here, the rotor support is advantageously connected to a converter cover and also to a pump wheel of a torsional moment converter, in each case in a non-rotational manner, wherein a second inner disc carrier of a second set of discs of a converter lockup clutch is also non-rotationally connected to the rotor support. Here, a first set of discs of the separating clutch, a first actuating piston of the separating clutch, the second set of discs, and the pump wheel are advantageously arranged one after the other in the sequence specified when seen in an axial direction.

In this way, an optionally dry region of the separating clutch can be kept separate from a wet region of the torsional moment converter, wherein an actuation space of the separating clutch is nevertheless still adjacent to the wet region and can advantageously be supplied with a hydraulic fluid.

Further advantageous designs and developments emerge from the drawing.

BRIEF DESCRIPTION OF THE DRAWING FIGURE

The sole FIGURE illustrates a hybrid drive system according to embodiments of the invention.

DETAILED DESCRIPTION

Here, the single FIGURE shows a hybrid drive system 10, which has a housing 12 and an input shaft 14, which is provided to introduce torsional moments, which can be provided by an internal combustion engine, into the hybrid drive system 10, and which is rotatably mounted around a rotational axis 16.

A direction aligned in parallel to the rotational axis 16 is referred to below as an axial direction 62, a direction arranged perpendicularly to the rotational axis 16 as a radial direction 64.

The hybrid drive system 10 further has an output shaft 18 arranged coaxially in relation to the input shaft 14, the output shaft being suitable as the input shaft for a downstream transmission, and an electric motor 20 and a separating clutch 34, which, for its part, has a first set of discs 35 having a first inner disc carrier 36 and a first outer disc carrier 38.

The separating clutch 34 can be designed as a dry separating clutch, wherein it is meant that cooling and/or lubricating fluid is not provided for the set of discs. Yet the separating clutch 34 can also be designed as a wet separating clutch, wherein it is meant that a cooling and/or lubricating fluid is provided for the set of discs.

The electric motor 20 has a stator 22, a rotor 24, and a rotor support 26, wherein the rotor support 26 is non-rotationally connected to the rotor 24. Here, the rotor support 26 has a support hub 28, a support wall 30, and a support cylinder 32. The rotor support 26 is rotatably mounted by means of the support hub 28; the rotor support 26 is supported radially in relation to its bearing by means of the support wall 30 and the support cylinder 32. The support cylinder 32 here substantially has a cylindrical shape and is arranged coaxially in relation to the rotational axis 16. The support wall 30 here substantially has the shape of a plate and is also arranged coaxially in relation to the rotation axis 16.

Here, a first bearing 40 is arranged between the support hub 28 and the housing 12. The first bearing 40 is advantageously arranged directly between the support hub 28 and the housing 12 and is formed to rotatably mount the support hub 28 in relation to the housing 12.

According to the invention, a second bearing 42 is provided which is arranged directly between the support hub 28 and the input shaft 14 and which is formed to rotatably mount the support hub 28 in relation to the input shaft 14. Wherein, further according to the invention, the support wall 30 and the support cylinder 32 are designed as a one-piece sheet metal part.

The first bearing 40 and the second bearing 42 are advantageously designed as sealed, lifetime-lubricated stationary bearings.

It is meant by the one-piece sheet metal part that the support wall 30 and the support cylinder 32 are not joined but rather are produced from a single sheet metal part, for example by means of a drawing production process.

With the entirety of the features described above, a good encapsulation of the first set of discs of the separating clutch 34 is obtained.

Here, the rotor support 26 is particularly advantageously non-rotationally connected to the outer disc carrier 38 of the separating clutch 34 in a non-rotational manner. Particularly advantageously, the outer disc carrier 38 is radially surrounded by the rotor 24, wherein outer disc carrier 38 and rotor 24 are arranged to overlap axially at least partially, advantageously extensively.

The design according to the invention can efficiently prevent dirt and/or cooling fluid from a region of the first set of discs 35 reaching a region of the rotor 24, the stator 22, a power electronics system, and ports of the electric motor 20. This dirt or this fluid would have to reach from a region lying radially inside of the rotor support 26 to a region lying radially outside of the rotor support 26, which, on one hand, is prevented by a one-piece design of the support wall 30 and support cylinder 32 and, on the other hand, by the first bearing 40 and the second bearing 42. Simply due to their arrangement, the first bearing 40 and the second bearing 42 seal the region lying radially outside of the rotor support 26 from the region lying radially inside of the rotor support 26.

Here, the support hub 28 and the support wall 30 are advantageously welded to each other, which contributes to a further separation of the two regions.

Particularly advantageously, the first bearing 40 and the second bearing 42 are designed as sealed and lifetime-lubricated bearings. Advantageously, the first bearing 40 and the second bearing 42 are designed as stationary bearings, i.e., as radially and axially supporting bearings.

Advantageously, the first bearing 40 is arranged to radially surround and axially overlap with the second bearing 42, wherein the first bearing 40, for its part, is arranged to radially surround the support hub 28, and the support hub 28 is arranged to radially surround the second bearing 42.

In order to obtain a further shielding of the region lying radially inside of the rotor support 26, a third bearing 44 is advantageously provided. The third bearing 44 is designed at least as a radial bearing. Advantageously, the third bearing 44 is designed as a floating bearing, which supports radially. Advantageously, the third bearing 44 is designed as a radially supporting deep groove ball bearing, which is arranged axially shiftably on the input shaft 14.

The third bearing 44 is arranged coaxially in relation to the input shaft 14 or coaxially in relation to the rotational axis 16. The first bearing 40 and the second bearing 42 are also arranged coaxially in relation to the rotational axis 16.

In the exemplary embodiment, a particularly advantageous hybrid drive system 10 having a torsional moment converter 46 is depicted, wherein the torsional moment converter 46 has a pump wheel 48, a converter cover 50 non-rotationally connected to the pump wheel 48, and a converter hub 52 non-rotationally connected to the converter cover 50, wherein the third bearing 44 is arranged directly between the input shaft 14 and the converter hub 52 and is formed to non-rotationally bear the converter hub 52 against the input shaft 14.

Advantageously, the converter hub 52 is non-rotationally connected to a second inner disc carrier of a second set of discs 58 of a converter lockup clutch 56. An outer disc carrier of the second set of discs 58 is non-rotationally connected to a torsional damper 60.

Advantageously, a connection point 54 of a non-rotational connection of a first inner disc carrier 36 to the input shaft 14 is axially arranged between the second bearing 42 and the third bearing 44.

The encapsulation, mentioned above, of the region lying radially inside of the rotor support 26 can be implemented particularly efficiently because of an arrangement, mentioned in the exemplary embodiment, of components. Here, a first actuation piston 53 of the separating clutch 34, which is mounted on the converter hub 52, is advantageously arranged in such a way that the first bearing 40, the support wall 30, the third bearing 44, and the first actuation piston 53 are arranged one after the other in the sequence specified in the axial direction 62.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10 Hybrid drive system
12 Housing

14 Input shaft
16 Rotational axis
18 Output shaft
20 Electric motor
22 Stator
24 Rotor
26 Rotor support
28 Support hub
30 Support wall
32 Support cylinder
34 Separating clutch
35 First set of discs
36 First inner disc carrier
38 First outer disc carrier
40 First bearing
42 Second bearing
44 Third bearing
46 Torsional moment converter
48 Pump wheel
50 Converter cover
52 Converter hub
53 First actuation piston
54 Connection point
56 Converter lockup clutch
58 Second set of discs
60 Torsional damper
62 Axial direction
64 Radial direction

The invention claimed is:

1. A hybrid drive system for a motor vehicle, the hybrid drive system comprising:
a housing;
an input shaft, which is configured to introduce torsional moments provided by an internal combustion engine into the hybrid drive system, wherein the input shaft is rotatably mounted around a rotational axis;
an output shaft arranged coaxially in relation to the input shaft;
an electric motor having a stator and a rotor;
a rotor support, which is non-rotationally connected to the rotor, wherein the rotor support has a support hub, a support wall, and a support cylinder;
a separating clutch having a first inner disc carrier and a first outer disc carrier;
a first bearing arranged between the support hub and the housing, wherein the first bearing is arranged to rotatably mount the support hub in relation to the housing;
a second bearing arranged between the support hub and the input shaft, wherein the second bearing is arranged to rotatably mount the support hub in relation to the input shaft, wherein the support wall and the support cylinder are a one-piece sheet metal part, wherein the first inner disc carrier is non-rotationally connected to the input shaft, and the first outer disc carrier is non-rotationally connected to the rotor support;
a third bearing; and
a torsional moment converter having a pump wheel, a converter cover non-rotationally connected to the pump wheel, and a converter hub non-rotationally connected to the converter cover, wherein the third bearing is arranged between the input shaft and the converter hub and rotatably mounts the converter hub in relation to the input shaft.

2. The hybrid drive system of claim 1, wherein the first bearing radially surrounds and axially overlaps with the second bearing.

3. The hybrid drive system of claim 1, wherein the first bearing radially surrounds the support hub.

4. The hybrid drive system of claim 1, wherein the support hub radially surrounds the second bearing.

5. The hybrid drive system of claim 1, wherein a connection point of non-rotational connection of the first inner disc carrier to the input shaft is arranged axially between the second bearing and the third bearing.

6. The hybrid drive system of claim 1, further comprising:
a first actuation piston of the separating clutch, which is mounted on the converter hub, wherein the first bearing, the support wall, the third bearing, and the actuation piston are arranged one after the other in sequence in an axial direction.

* * * * *